United States Patent [19]
Word

[11] Patent Number: 5,647,642
[45] Date of Patent: Jul. 15, 1997

[54] ASYMMETRIC VEHICLE WHEEL WITH INTEGRAL COUNTERBALANCE

[75] Inventor: James A. Word, Canton, Mich.

[73] Assignee: Hayes Wheels International, Inc., Romulus, Mich.

[21] Appl. No.: 366,291

[22] Filed: Dec. 28, 1994

[51] Int. Cl.[6] .................................................. B60B 3/06
[52] U.S. Cl. ............................... 301/5.21; 301/64.1
[58] Field of Search .......................... 301/5.21, 5.22, 301/65, 9.1, 9.2, 13.2, 35.1, 64.1; D12/204, 207, 208, 206, 209, 211

[56] References Cited

U.S. PATENT DOCUMENTS

| | | | |
|---|---|---|---|
| D. 210,397 | 3/1968 | Edwards | D34/15 |
| 2,847,250 | 8/1958 | Hennecke | 301/5 |
| 3,008,768 | 11/1961 | Kinsey et al. | 301/5 |
| 3,890,008 | 6/1975 | Lejeune | 301/5 B |
| 4,379,596 | 4/1983 | Green et al. | 301/5 B |
| 4,436,133 | 3/1984 | Rohr | 152/381.3 |
| 4,728,154 | 3/1988 | Boyle et al. | 301/5 B |
| 5,271,663 | 12/1993 | Maldini et al. | 301/5.22 |
| 5,292,182 | 3/1994 | Kanazawa et al. | 301/65 |
| 5,350,220 | 9/1994 | Atwell, Jr. | 301/5.21 |

OTHER PUBLICATIONS

Kent, Kent's Mechanical Engineers' Handbook, pp. 14–40 to 14–43. 1936.
Advertisement for Ronal Bear Wheel, *Car and Driver*, p. 109 (Aug. 1993).
Photographs of Ronal Bear Wheel (inboard and outboard views) taken Feb. 15, 1995.
Photographs of displays at Detroit Auto Show taken in 1992.
Photograph of display at Prague Auto Show taken in 1992.

*Primary Examiner*—David M. Mitchell
*Assistant Examiner*—Jonathan J. Yun
*Attorney, Agent, or Firm*—McMillan, Sobanski & Todd

[57] ABSTRACT

An automotive wheel having an outboard face presenting an asymmetric appearance and having a permanently fixed counterbalance weight near the outer periphery of the wheel to balance the wheel. The wheel disk has an asymmetric design which tends to statically and dynamically unbalance the wheel. A relatively light counterbalance weight is permanently fixed to the wheel during manufacture of the wheel. This counterbalance weight statically and dynamically balances the overall wheel.

9 Claims, 2 Drawing Sheets

ASYMMETRIC VEHICLE WHEEL WITH INTEGRAL COUNTERBALANCE

BACKGROUND OF THE INVENTION

This invention relates in general to vehicle wheels and, in particular, to a vehicle wheel which has an outboard rice presenting an asymmetric appearance and a permanently fixed counterbalance weight near the outer periphery thereof to balance the wheel.

It is well known that vehicle wheels should be balanced, both statically and dynamically. Static balance is achieved when the center of gravity of the wheel is located in the axis of rotation of the wheel. Dynamic balance is achieved when the mass of the wheel is distributed such that no net force couple is created when the wheel is rotated about the axis of rotation. In other words, when the wheel is rotated about the axis of rotation, each portion of the mass of the wheel generates a radially directed force. When that force is opposed equally and oppositely by a second force generated by another portion of the wheel, and the lines of action of the two opposing force perpendicular to the axis of rotation pass through the same point on the axis of rotation, the wheel is dynamically balanced.

Proper static and dynamic balancing of the wheels of a vehicle is important to obtain good, safe handling and a smooth ride, and to minimize tire wear. It has therefore been standard practice to attempt to build wheels with a minimum of imbalance. After a tire is mounted on the wheel, a balance weight may be temporarily attached to the wheel to correct any imbalance created by manufacturing imperfections in the wheel and the tire. The balance weight is removed when the tire is replaced, and a new balance weight may be temporarily attached.

SUMMARY OF THE INVENTION

This invention relates to an automotive wheel having an outboard face presenting an asymmetric appearance and having a permanently fixed counterbalance weight near the outer periphery of the wheel to balance the wheel. The wheel disk has an asymmetric design which tends to statically and dynamically unbalance the wheel. A relatively light counterbalance weight is permanently fixed to the wheel during manufacture of the wheel. This counterbalance weight statically and dynamically balances the overall wheel.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
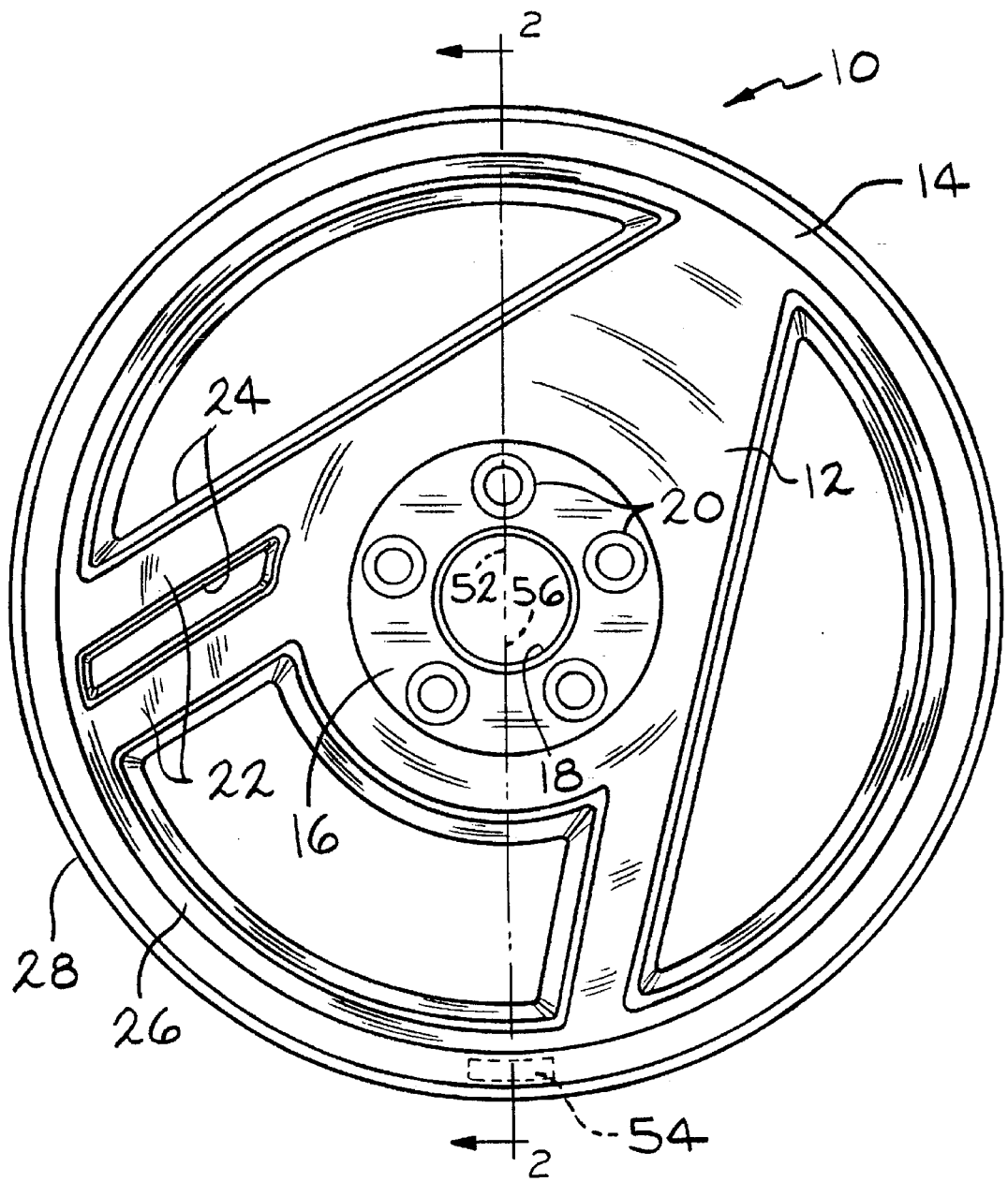
FIG. 1 is a elevational view of the outboard face of a typical asymmetric wheel.
Figure 2:
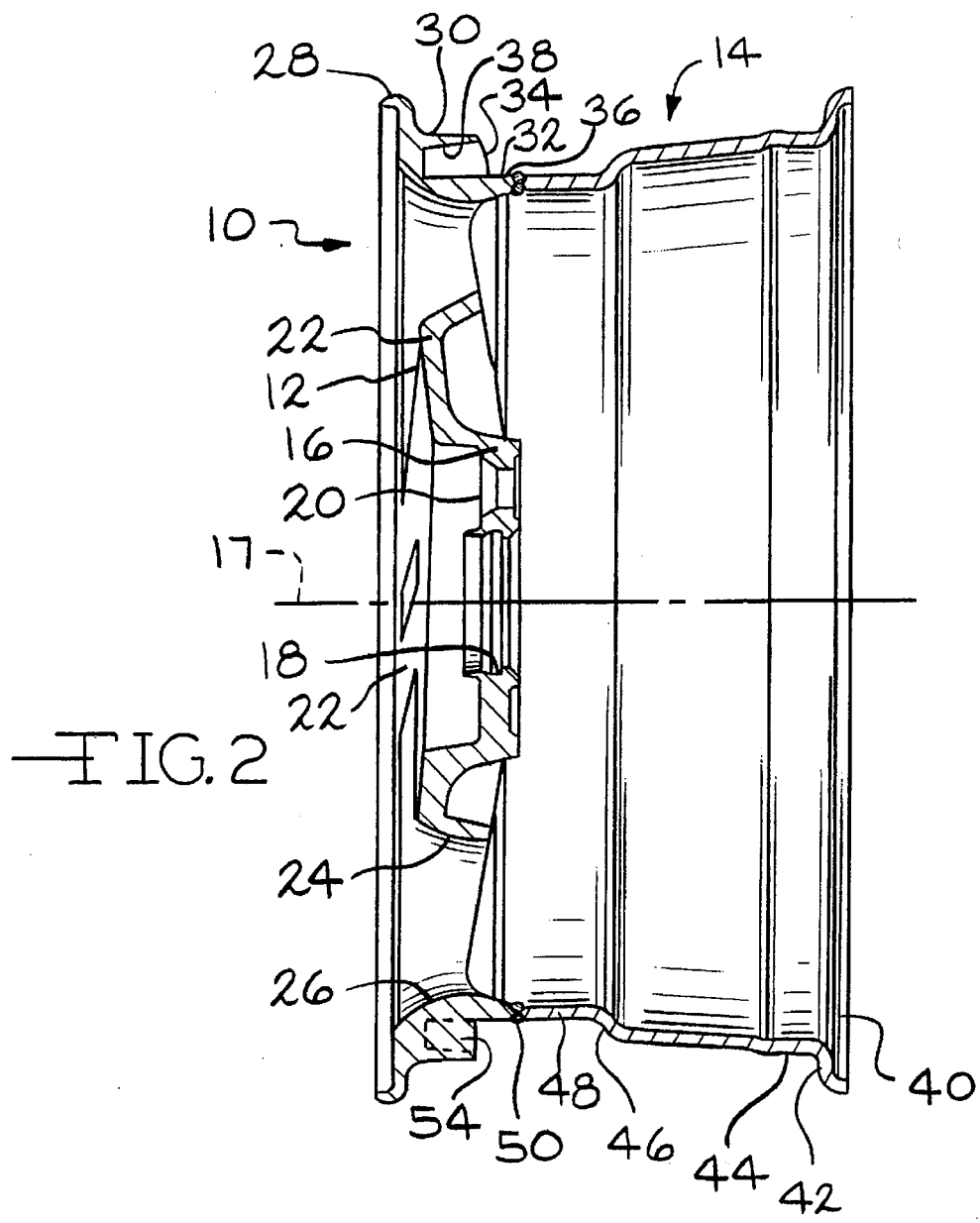
FIG. 2 is a sectional view taken along the line 2—2 of FIG. 1.

Referring now to the drawings, there is illustrated in FIGS. 1 and 2 a wheel, generally indicated at 10, constructed according to the invention. The wheel 10 includes an axially outboard wheel disk 12, and a wheel rim 14. As used herein, the term "outboard" means that portion or surface of the wheel 10, or other component under discussion, which is intended to be farthest away from the longitudinal centerline (not shown) of a vehicle, as measured along a rotational axis of the wheel 10, when the wheel 10 is normally mounted to support the vehicle. Similarly, the term "inboard" means that portion or surface of the wheel 10, or other component under discussion, which is intended to be axially closest to the longitudinal centerline of a vehicle when the wheel 10 is normally mounted to support the vehicle. The wheel 10 may be formed of any suitable material or materials, including metals such as steel, aluminum, titanium, magnesium, or alloys thereof.

The wheel disk 12 has a central hub 16. The hub 16 of the wheel disk 12 includes a centrally disposed pilot opening 18 surrounded by a plurality of circumferentially spaced apertures 20. The apertures 20 receive the mounting studs (not illustrated) on a vehicle (not illustrated). The wheel disk 12 has a sculpted surface which may include a plurality of spokes 22 or other structures which define a plurality of through openings 24 between the hub 16 and a radially outer annular portion 26 of the wheel 10. Various asymmetric spoke designs, holed disk designs, basket weave designs, and the like may be used to produce a desired artistic design on the outboard face of the wheel disk 12. The asymmetric design of the wheel disk 12 results in unequal distribution of the mass of the wheel disk 12 about the pilot opening 18, which causes the wheel disk 12 to statically and dynamically unbalance the wheel 10 during rotation about defined by the pilot opening 18 and indicated by the dashed line 17 in FIG. 2. Of course the wheel 10 must also be designed to meet the structural integrity requirements for use as a vehicle wheel. The wheel disk 12 may be integrally formed with the annular portion 26 of the wheel.

The annular portion 26 of the wheel 10 forms a portion of the wheel rim 14, and includes an outboard tire bead retaining flange 28 and an outboard bead seat 30. An axially extending annular flange 32 is formed on an inboard surface of the annular portion 26. The flange 32 forms an outboard deep well side wall 34 and an outboard portion 36 of a deep well. A lightener groove 38 is formed in an inboard surface of the annular portion 26 of the wheel 10 to reduce the weight and inertia of the wheel disk 12.

The wheel rim 14 of the wheel 10 also includes a partial wheel rim 40. The partial wheel rim 40 includes an inboard tire bead retaining flange 42, an inboard bead seat 44, an inboard deep well side wall 46, and a cylindrical inboard portion 48 of the deep well. The partial wheel rim 40 will preferably be formed of a material similar to the material of the wheel disk 12, and may be formed by any suitable process, such as rolling, spinning, or casting. With the partial wheel rim 40 and the wheel disk 12 held in coaxial alignment, they may be joined by forming a circumferentially continuous weld 50 between the inboard portion 48 of the deep well and the outboard portion of the deep well, thereby forming the wheel 10. The weld 50 may be formed by such conventional processes as gas metal arc welding or electron beam welding.

The wheel 10 as thus far described is statically and dynamically unbalanced by the asymmetric wheel disk 12. The center of gravity of the wheel 10 will not be in the geometric center of the wheel 10 (i.e., in the axis of rotation 17), but rather will lie along the radially extending line segment shown as a phantom line 52 in FIG. 1, which excludes the geometric center of the wheel 10. Thus the line segment 52 indicates the angular orientation of the heaviest portion of the wheel 10. Rotation of the wheel 10 about the axis of rotation will cause the unbalanced mass of the wheel disk 12 to generate a force directed radially outwardly along the line segment 52.

To balance the wheel 10 in accordance with the present invention, a weight 54 is fixed to the inboard surface of the annular portion 26 in the lightener groove 38 diametrically opposite the heaviest portion of the wheel 10. The weight 54 will be positioned on the radially extending line segment shown as a dashed line 56 in FIG. 1, which is collinear with the line segment 52. The weight 54 is selected to be of sufficient mass to counterbalance the imbalance of the wheel disk 12, bringing the wheel 10 into static balance.

Note that because the weight 54 is positioned in the lightener groove 38 formed in the annular portion 26 of the wheel 10, which is radially outward of the unbalanced wheel disk 12, the weight 54 may be relatively light and still counterbalance the wheel disk 12. Additionally, it should also be noted that because the lightener groove 38 is in the same general plane as the spokes 22 of the wheel disk 12, the weight 54 will counterbalance the wheel disk 12 to also bring the wheel 10 into dynamic balance.

The weight 54 is permanently fixed in the lightener groove 38 of the wheel 10. This may be accomplished in a cast wheel 10 during the manufacture of the annular portion 26. However, it is contemplated that the weight 54 may be permanently fixed to the wheel 10 by any other suitable means, such as welding a separately formed weight 54 into the desired location in the lightener groove 38 of the wheel 10.

While a single weight 54 has been described to counterbalance the asymmetric wheel disk 12, it will be recognized by those of ordinary skill in the art that multiple weights (not shown) can be added on opposite sides of the line segment 56 in addition to, or instead of, the weight 54. The weights should be selected and position such that combined effect of these weights, acting along the line segment 56, counterbalances the wheel disk 12. Additionally, these weights should be so positioned and be of such a size that the forces generated perpendicular to the line segment 56 by the weights on one side of the line segment 56 should be perfectly balanced by the forces generated perpendicular to the line segment 56 by the weights on the other side of the line segment 56. The weights should also not create a force couple dynamically unbalancing the wheel 10. The net effect of these weights should act only radially outwardly along the line segment 56.

The above described embodiment provides for fixing the weight 54 in the lightener groove 38 of the wheel 10. However, the wheel of this invention, which is characterized by a wheel disk having an asymmetrically disposed element tending to unbalance the wheel, may have a weight permanently fixed to any portion of the wheel to counterbalance the asymmetric wheel disk element. Preferably, the weight will be secured in a relatively inconspicuous location, and will preferably will be attached to the wheel rim.

Figure 3:
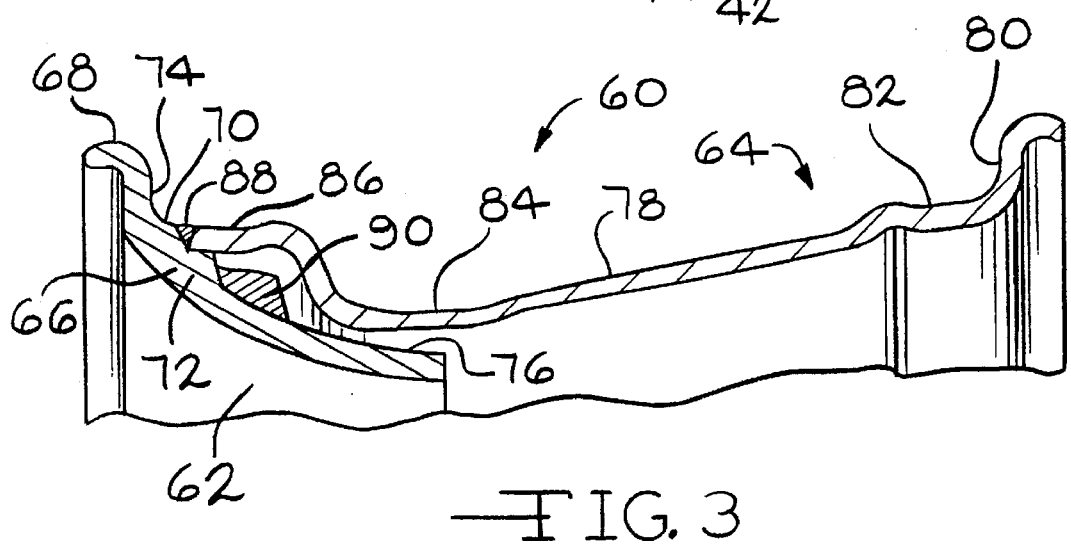
FIG. 3 is a partial sectional view a second embodiment of the invention.

For example, FIG. 3 shows a partial sectional view of a second wheel, indicated generally at 60, according to the invention. The wheel 60 includes a wheel disk 62 having an asymmetric design (not shown) which causes the wheel disk 62 to be unbalanced. A wheel rim 64 includes an annular portion 66 of the wheel 60. The annular portion 66 of the wheel rim 64 includes an outboard tire bead retaining flange 68 and a portion of an outboard bead seat 70. A stepped shoulder 72 is formed on the inboard face 74 of the annular portion 66. The inboard face 74 of the annular portion 66 includes a portion 76 which is radially inboard of the shoulder 72.

The wheel rim 64 also includes a partial wheel rim 78. The partial wheel rim 78 includes an inboard tire bead retaining flange 80, an inboard bead seat 82, a deep well portion 84, and a cylindrical outboard end portion 86 which forms an inboard portion of the outboard bead seat 70. The outboard end portion 86 is fitted about the shoulder 72 on the annular portion 66, thereby axially aligning the partial wheel rim 78 with the rest of the wheel 60. A circumferentially continuous weld 88 joins the end portion 86 of the partial wheel rim 78 and the shoulder 72, thereby forming the wheel 60. The weld 88 may be formed by such conventional processes as gas metal arc welding or electron beam welding.

A weight 90 is permanently fixed to the portion 76 of the inboard face 74 of the annular portion 66, diametrically opposite the heavy portion of the wheel disk 62. The weight 90 has sufficient mass and is positioned sufficiently radially outwardly to counterbalance the asymmetric wheel disk 62. The weight 90 is preferably cast integrally with the annular portion 66, but may be otherwise permanently fixed to the annular portion 66 of the wheel 60 or elsewhere on the rim 64 of the wheel 60. Owing to its position on the inboard face 74 of the annular portion 66, the weight 90 is not observable from the outboard face of the wheel 60, and thus will not interfere with the aesthetic effect of the design thereon. Furthermore, the weight 90 is located in the plane passing through the middle of the wheel disk 62, and thus will not form a force couple with the force exerted by the unbalanced wheel disk 62. Therefore, the weight 90 can counterbalance the wheel disk 62 to bring the wheel 60 into static and dynamic balance.

While the invention has been described as a wheel formed from a single partial wheel rim and a separately cast or forged wheel disk, the invention described above may be practiced in wheels formed as single piece castings, or in other types of wheels formed by any suitable process such stamping, forging, casting, or fabrication from multiple components. Additionally, the components of the wheels may be formed of any material or materials suitable for making vehicle wheels.

Furthermore, it is contemplated that the wheel may be constructed which is radially asymmetric at more than one general point along the axis of rotation of the wheel. For example the wheel disk may have elements thereof which are located in a first plane perpendicular to the axis of rotation of the wheel which are asymmetrically distributed to unbalance the wheel in a first radial direction. The wheel disk may have additional elements asymmetrically distributed in a second plane, perpendicular to the axis of rotation of the wheel and spaced apart from the first plane, which tend to unbalance the wheel in a second radial direction, different from the first radial direction. A weight may be permanently fixed to the wheel in each of the first and second planes to balance the wheel. Alternatively, one or more weights may be permanently fixed to the wheel outside of the first and second planes to bring the wheel into static and dynamic balance.

In accordance with the provisions of the patent statutes, the principle and mode of operation of the present invention have been explained and illustrated in the preferred embodiment, however, it will be understood that the present invention may be practiced otherwise than as specifically explained and illustrated without departing from its spirit or scope.

What is claimed is:

1. A vehicle wheel comprising:
   a wheel disk having a sculpted surface with an asymmetric design tending to unbalance said wheel disk;

an annular wheel rim disposed about said wheel disk and fixed thereto, said wheel rim being adapted to carry a pneumatic vehicle tire; and at least one weight permanently fixed to said wheel rim for counterbalancing said wheel disk to balance said wheel, wherein said weight is fused with said wheel rim whereby said wheel disk and wheel rim are balanced without a pneumatic vehicle tire being carried by said wheel rim.

2. The vehicle wheel defined in claim 1 wherein said weight is integrally formed with said wheel rim.

3. The vehicle wheel defined in claim 1 wherein said wheel rim is a cast component and said weight is integrally cast as a part of said wheel rim.

4. The vehicle wheel defined in claim 1 wherein said vehicle wheel defines a rotational axis, said wheel rim further comprising an inboard surface facing a first direction along said axis, said weight being fixed to said inboard surface of said wheel rim.

5. The vehicle wheel defined in claim 4 wherein said wheel rim is cast with said weight integrally cast as a part of said wheel rim.

6. The vehicle wheel defined in claim 1 wherein said wheel rim includes an annular portion formed integrally with said wheel disk.

7. The vehicle wheel defined in claim 1 wherein said wheel disk defines a plane, said weight being disposed in said plane.

8. A vehicle wheel comprising:

a wheel disc defining a plane and an axis of rotation perpendicular to said plane, said wheel disc having a sculpted surface causing an asymmetric distribution of mass about said axis of rotation;

a wheel rim coaxially disposed about said wheel disc and including an annular portion, which includes at least a portion of an outboard tire bead seat, fixed to said wheel disc and a partial wheel rim portion, which includes an inboard tire bead seat, fixed to said annular portion; and a weight integrally formed as a part of said annular portion of said wheel rim, said weight being disposed within said plane for counterbalancing said wheel disc and statically and dynamically balancing said wheel.

9. A vehicle wheel comprising:

a wheel disk having a sculpted surface with an asymmetrically disposed component thereof tending to unbalance said wheel disk;

an annular wheel rim fixed to said wheel disk, said wheel rim being adapted to carry a pneumatic vehicle tire; and at least one weight permanently fixed to one of said wheel rim and said wheel disk for counterbalancing said asymmetrically disposed component to balance said wheel whereby said wheel is balanced before a pneumatic vehicle tire is mounted on said wheel rim, wherein said weight is fused with one of said wheel rim and said wheel disk.

* * * * *